United States Patent
Roth et al.

(10) Patent No.: US 9,688,136 B2
(45) Date of Patent: Jun. 27, 2017

(54) CHARGING HOUSING OR FILLER NECK HOUSING

(71) Applicants: Bayerische Motoren Werke Aktiengesellschaft, München (DE); Illinois Tool Works Inc., Glenview, IL (US)

(72) Inventors: Thomas Roth, Würzburg (DE); Christian Beck, Röttingen (DE); Stephan Großmann, München (DE); Sebastian Pfenning, Rimpar (DE)

(73) Assignees: BAYERISCHE MOTOREN WERKE AKTIENGESELLSCHAFT, Munich (DE); ILLINOIS TOOL WORKS, INC., Glenview, IL (US)

(*) Notice: Subject to any disclaimer, the term of this patent is extended or adjusted under 35 U.S.C. 154(b) by 80 days.

(21) Appl. No.: 14/674,592

(22) Filed: Mar. 31, 2015

(65) Prior Publication Data
US 2015/0274010 A1    Oct. 1, 2015

(30) Foreign Application Priority Data
Mar. 31, 2014 (DE) .................. 10 2014 104 501

(51) Int. Cl.
| | |
|---|---|
| *B60K 15/05* | (2006.01) |
| *F16J 15/02* | (2006.01) |
| *F16J 15/06* | (2006.01) |
| B60K 15/04 | (2006.01) |
| B60K 15/03 | (2006.01) |

(52) U.S. Cl.
CPC ............. *B60K 15/05* (2013.01); *F16J 15/025* (2013.01); *F16J 15/061* (2013.01); *B60K 2015/03447* (2013.01); *B60K 2015/0458* (2013.01); *B60K 2015/053* (2013.01)

(58) Field of Classification Search
CPC .. B60K 15/05; B60K 2015/053; B60K 15/04; B60K 2015/0576; B60K 2015/0553; B60K 2015/0561; F16J 15/10; F16J 13/18; F16J 15/02; F16J 15/025; F16J 15/061
USPC .......... 296/97.22, 136.01, 146.9, 155, 183.1; 49/394, 325, 26, 323, 386; 220/86.2, 220/830, 211, 375, 378
See application file for complete search history.

(56) References Cited

U.S. PATENT DOCUMENTS

| | | | |
|---|---|---|---|
| 6,446,826 B1* | 9/2002 | Foltz ...................... | B60K 15/04 220/203.01 |
| 8,430,140 B2* | 4/2013 | Ognjanovski ...... | B60K 15/0406 141/350 |

(Continued)

*Primary Examiner* — Glenn Dayoan
*Assistant Examiner* — Sunsurraye Westbrook
(74) *Attorney, Agent, or Firm* — Young Basile Hanlon & MacFarlane, P.C.

(57) ABSTRACT

A charging housing or filler neck housing for insertion into a body opening in a motor vehicle comprises a housing body with a passage opening. A plug-in charging connector or a tank filler pipe can be inserted into the passage opening, and a sealing ring is arranged on the passage opening. The sealing ring has an annular sealing body, from which a first elastic sealing lip and a second elastic sealing lip extend, wherein the first sealing lip is designed to bear against a plug-in charging connector or tank filler pipe inserted into the passage opening, and wherein the second sealing lip is designed to bear against a closure flap closing the filler neck housing or charging housing.

20 Claims, 4 Drawing Sheets

(56) References Cited

U.S. PATENT DOCUMENTS

| | | | | |
|---|---|---|---|---|
| 8,684,443 B2* | 4/2014 | Hara | ............ | B60R 19/48 296/97.22 |
| 8,770,648 B2* | 7/2014 | Eberle | ............ | B60L 11/1824 296/97.22 |
| 8,794,467 B2* | 8/2014 | Zentner | ............ | B60K 15/04 141/313 |
| 8,905,458 B2* | 12/2014 | Pipp | ............ | B60K 15/05 141/348 |

* cited by examiner

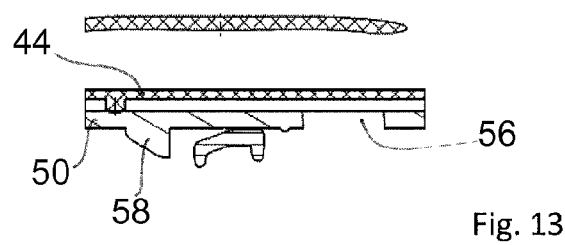
Fig. 13
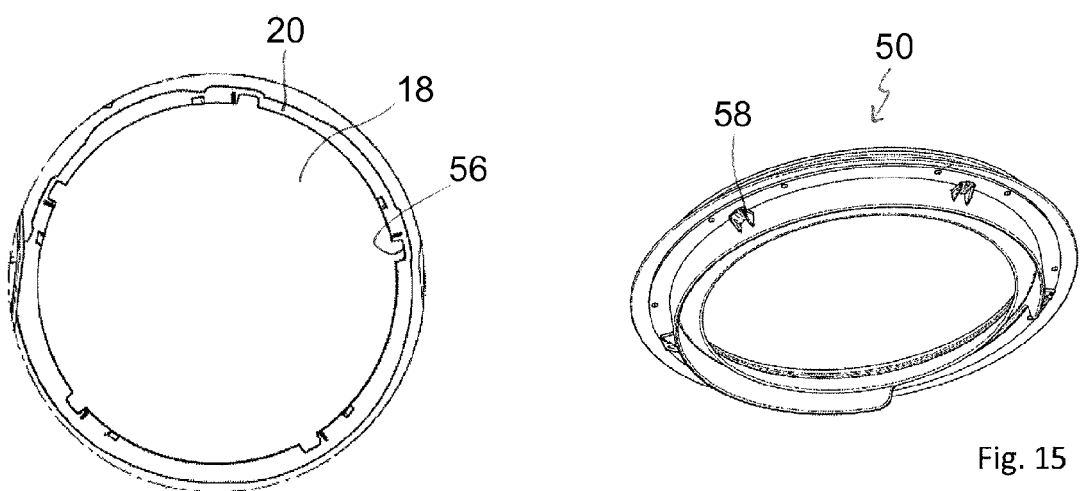
Fig. 14
Fig. 15
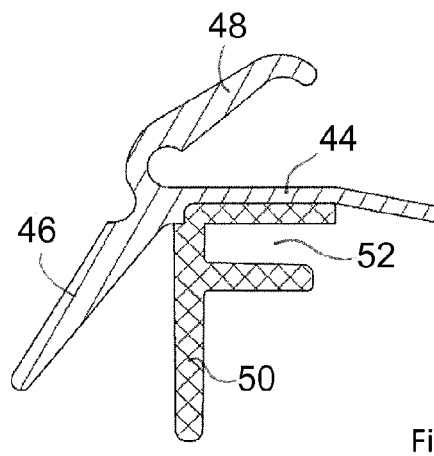
Fig. 16

CHARGING HOUSING OR FILLER NECK HOUSING

CROSS-REFERENCE TO RELATED APPLICATION

This application claims priority to German patent application no. 10 2014 104 501.7, filed Mar. 31, 2014, the entire content of which is incorporated herein by reference.

TECHNICAL FIELD

The disclosure relates to a charging housing or filler neck housing for insertion into a body opening in a motor vehicle.

BACKGROUND

Charging housings or filler neck housings for charging the batteries of an electric or hybrid motor vehicle or for refilling a motor vehicle with fuel or a urea solution (AdBlue) are inserted, for example clipped or adhesively bonded, into a body opening in the motor vehicle. Charging housings or filler neck housings of this type have a passage opening into which a plug-in charging connector connected to the batteries of the motor vehicle or a tank filler pipe leading to a tank of the motor vehicle is inserted. A closure flap is moveable, in particular pivotable, between an open position opening up the charging housing or filler neck housing for a charging or filling operation and a closed position closing the charging housing or filler neck housing. In its closed position, the closure flap forms part of the outer skin of the motor vehicle body.

In particular in the case of charging housings, but also, for example, in the case of filler neck housings for capless filling systems (capless systems), it is important to avoid penetration of contaminants, such as dust or water.

SUMMARY

Existing solutions to achieve an adequate sealing effect are complex in terms of production. This is true in particular if component and position tolerances are also intended to be compensated for by the seals. Accordingly, it would be desirable to provide a charging housing or filler neck housing that ensures reliable sealing even in the case of component or position tolerances, in a manner which is simple in terms of production.

For a charging housing or filler neck housing described herein, a sealing ring has an annular sealing body, from which a first elastic sealing lip and a second elastic sealing lip extend. The first sealing lip is designed to bear against a plug-in charging connector or tank filler pipe inserted into the passage opening, and the second sealing lip is designed to bear against a closure flap closing the filler neck housing or charging housing.

Where the term "motor vehicle" is used here, this means, for example, passenger vehicles or lorries irrespective in each case of the type of drive thereof.

According to the teachings herein, the subject matter can be formed in a charging housing for charging electric batteries of an electric or hybrid motor vehicle. The sealing lips provide the protective function desired in the respective application, in particular against the entry of dust and/or liquid, for example the entry of water. Sealing against dust, water or other contaminants is of high importance in the case of such a charging housing. In this case, a plug-in charging connector is inserted into the passage opening in the housing body of the charging housing, and a corresponding plug-in charging connector for charging the electric batteries can be connected thereto from the outside. The plug-in charging connector inserted into the passage opening in the housing body is correspondingly connected to the electric batteries of the motor vehicle. Where the term "plug-in charging connector" is used in this here, this can mean either an electric charging plug or an electric charging socket. That is, together with the teachings herein, a charging plug, to which a corresponding charging socket is connected from the outside, may be provided on the charging housing or a charging socket, to which a corresponding charging plug is connected from the outside, may be provided on the charging housing.

According to the teachings herein, the subject matter can also be formed in a filler neck housing for introducing a fuel, in particular a diesel or petrol fuel or a liquefied gas fuel (LPG) or a natural gas fuel (CNG). The filler neck housing can also be used for introducing a urea solution (AdBlue) or the like. In particular, the filler neck housing can be a capless filler neck housing (capless system). Reliable sealing against dust, water or other contaminants is also of great importance in the case of capless systems. If the subject matter is formed in a filler neck housing, a tank filler pipe is inserted into the filler neck housing. The tank filler pipe has a filler opening, through which fuel or, for example, a urea solution can be introduced into a corresponding tank of the motor vehicle. For this purpose, the tank filler pipe is connected to the tank.

The tank filler pipe or the plug-in charging connector can have a circular-cylindrical cross section.

The housing body can be, for example, clipped into the body opening. However, it is also possible to adhesively bond the housing body in the region of the body opening, in particular in the case of plastic bodies. It is also possible to weld the housing body to the body opening. Where the term "body opening" is used here, this also includes, for example, a bumper of a motor vehicle. The tank filler pipe or the plug-in charging connector can have an illuminated ring (what is referred to as a corona ring), which surrounds the outer side thereof and which faces the upper side of the charging housing or filler neck housing. The upper side is accessible from the outside so that convenient refilling or convenient electric charging is possible even in the dark. Where "sealing in relation to the plug-in charging connector or the tank filler pipe" is used here, this correspondingly also includes sealing in relation to such an optionally provided, illuminated ring. Where "sealing in relation to the closure flap" is used here, this also includes sealing in relation to a hinge arm of the closure flap or another holder of such a closure flap, irrespective of whether the hinge arm or the other holder is connected integrally to the actual flap of the closure flap or is a separate component that is connected to the actual flap of the closure flap. The closure flap in particular forms part of the outer skin of the motor vehicle.

The housing body of the charging housing or filler neck housing is preferably composed of plastic, in particular of a hard plastic component. The sealing ring is preferably but not necessarily formed integrally. It is preferably likewise composed of a plastic. In particular, the sealing ring may be composed of a softer material, in particular a softer plastic, than the charging housing or filler neck housing. The sealing ring described herein has an annular sealing body, from which two elastic sealing lips extend. In the fitted state, one of said sealing lips bears, in particular in a sealing manner, against the plug-in charging connector or tank filler pipe inserted into the passage opening in the housing body. When the closure flap is closed, the other of the sealing lips bears, in particular in a sealing manner, against the closure flap, in particular the inner side of the closure flap or of a hinge arm of the closure flap. The annular sealing body bearing the sealing lips can also be of flexible design. It then forms a membrane.

According to one implementation, three interfaces are sealed with just one sealing ring, namely the interface with the housing body by means of the annular sealing body, the interface with the plug-in charging connector or the tank filler pipe by means of the first sealing lip, and the interface with the closed closure flap by means of the second sealing lip.

Furthermore, owing to the flexibility of the sealing lips, low closing forces and low unlocking forces for the closure flap are achieved, for example, when a push-push unlocking device is used. Furthermore, compensation in relation to component or position tolerances, for example between the plug-in charging connector or the tank filler pipe and the housing body in the axial direction of the passage opening, is also achieved by means of the sealing ring with its flexible sealing lips. Such tolerances in the axial direction can be effectively compensated for by the sealing lips being correspondingly deformed. If the charging housing or filler neck housing is arranged laterally on a motor vehicle, the axial direction of the passage opening runs in particular substantially transversely with respect to the longitudinal axis of the vehicle (i.e., in the Y direction). The housing body can be manufactured together with the sealing ring in a simple manner in terms of production, for example, in a two-component injection-moulding process.

The first and second sealing lips can extend in opposite directions from the annular sealing body. The sealing lips can extend in particular parallel to each other. A particularly good sealing action is thereby achieved.

In a particularly simple manner in terms of production, the annular sealing body of the sealing ring can be injection moulded in a two-component injection-moulding process onto an edge bounding the passage opening in the housing body. At the same time, the sealing ring is thereby securely held on the housing body to provide reliable sealing.

According to a further refinement, the sealing ring can be mounted in a floating manner on the passage opening in the housing body. The floating mounting ensures freedom of movement of the sealing ring in particular in the lateral direction, i.e., perpendicularly to the axial direction of the passage opening in the housing body. If the charging housing or filler neck housing is arranged laterally on a motor vehicle, the floating mounting therefore permits movement in a plane spanned by the longitudinal axis of the vehicle and the vertical (X-Z plane). By means of the floating mounting, a further compensation for tolerances is possible wherein a self-centering alignment of the sealing ring with respect to the plug-in charging connector or the tank filler pipe, and therefore reliable sealing, is achieved. The sealing ring is thereby located centrally with respect to the plug-in charging connector or the tank filler pipe. Specifically if the plug-in charging connector and the tank filler pipe have an illuminated corona ring, a centred arrangement of the sealing ring is also desirable for optical reasons. Otherwise, the illuminated corona ring would be visible non-uniformly. The floating mounting of the flexible ring in the lateral direction in conjunction with the flexibility of the first and second sealing lips ensure compensation for tolerances in all three directions in space.

According to a further refinement, the first sealing lip can bear against a stop of the plug-in charging connector or of the tank filler pipe when the plug-in charging connector or tank filler pipe is inserted into the passage opening in the housing body. Alternatively, or additionally, it is possible that the second sealing lip bears against a stop of the closure flap when the closure flap is closed. By means of the stop, the first and/or second sealing lip and therefore the sealing ring, are carried along during a lateral movement of the plug-in charging connector or of the tank filler pipe and/or of the closure flap. As a result, the self-centering is ensured together with the floating mounting.

According to a further refinement, the annular sealing body of the sealing ring may have a slot that encircles said sealing body on the outer side thereof and in which an edge bounding the passage opening in the housing body is accommodated in a floating manner. Alternatively, an edge bounding the passage opening in the housing body may have an encircling slot in which the annular sealing body of the sealing ring is accommodated in a floating manner. Such a slot permits the desired freedom of movement in the X-Z plane in a particularly simple manner.

The charging housing or filler neck housing can furthermore have a carrier ring mounted in a floating manner on an edge bounding the passage opening in the housing body, wherein the sealing body of the sealing ring is arranged on the carrier ring. The carrier ring can be composed of a harder material than the sealing ring. It can be a carrier ring made of plastic or, for example, rubber. The carrier ring can be composed of the same material as or of a different material than the housing body. The sealing ring may be connected fixedly to the carrier ring. The carrier ring carries the sealing ring and conveys the floating moveability of the sealing ring. The carrier ring here can bear in turn against a stop of the plug-in charging connector or of the tank filler pipe. In a particularly simple manner, the sealing body of the sealing ring can be injection moulded in a two-component injection-moulding process onto the carrier ring. A further advantage of the carrier ring is that the latter can additionally take on a protective function against a passage of liquid from the inside to the outside. Furthermore, the solution with the carrier ring can be interchanged in a simple manner and is therefore serviceable and can also be used, for example, for country-specific different embodiments of tank filler pipes or plug-in charging connectors.

According to a further refinement, the carrier ring has a slot that encircles the outer side thereof and in which the edge bounding the passage opening in the housing body is accommodated in a floating manner. Alternatively, the edge bounding the passage opening in the housing body may have an encircling slot in which the carrier ring is accommodated in a floating manner. The slot again permits the desired freedom of movement in the X-Z plane in a particularly practical manner.

The carrier ring can be connected via a bayonet connection to the edge bounding the passage opening in the housing body. This achieves a particularly simple connection wherein a floating mounting can be realized at the same time.

The charging housing or filler neck housing can furthermore comprise a closure flap connected to the housing section so as to be pivotable between an open position opening up the charging housing or the filler neck housing and a closed position closing the charging housing or filler neck housing. The closure flap can have a hinge arm via which said closure flap is connected pivotably to the housing section. By pivoting of the hinge arm, the charging housing or filler neck housing can either be closed with the closure flap or opened for a refilling or charging operation. The hinge arm is therefore part of the closure flap. The actual flap of the closure flap can be formed integrally with the hinge arm. However, it is also possible for the hinge arm to be a separate component on which the actual flap of the closure flap can be fastened in a suitable manner. The charging housing or filler neck housing can furthermore have a push-push unlocking device for locking and unlocking the closure flap.

According to a further refinement, the closure flap can have an encircling splash wall facing the housing body. The splash wall can also be formed on a hinge arm of the closure flap. The splash wall encircles the inner side, which faces the housing body, of the closure flap or of a hinge arm of the closure flap in the form of a collar. It prevents water from entering even in the event of high water pressure occurring, for example, when a high-pressure cleaner is used.

The charging housing or filler neck housing can furthermore comprise a plug-in charging connector inserted into the passage opening of the housing body or a tank filler pipe inserted into the passage opening in the housing body.

Embodiments of the invention also relate to a motor vehicle comprising a charging housing or filler neck housing described herein that is inserted into a body opening in the motor vehicle.

BRIEF DESCRIPTION OF THE DRAWINGS

Exemplary embodiments of the invention are explained in greater detail below with reference to schematic figures, in which:

FIG. 13 shows a sectional view along the line C-C in FIG. 9;

FIG. 14 shows an excerpt showing the passage opening in the charging housing or filler neck housing shown in FIG. 9;

FIG. 15 shows a perspective view of a carrier ring of the charging housing or filler neck housing shown in FIG. 9; and FIG. 16 shows a cross section through the carrier ring shown in FIG. 15 with a sealing ring, which is arranged thereon, of the charging housing or filler neck housing from FIG. 9.

Unless stated otherwise, identical reference signs denote identical items in the figures.

DETAILED DESCRIPTION

Figure 1:
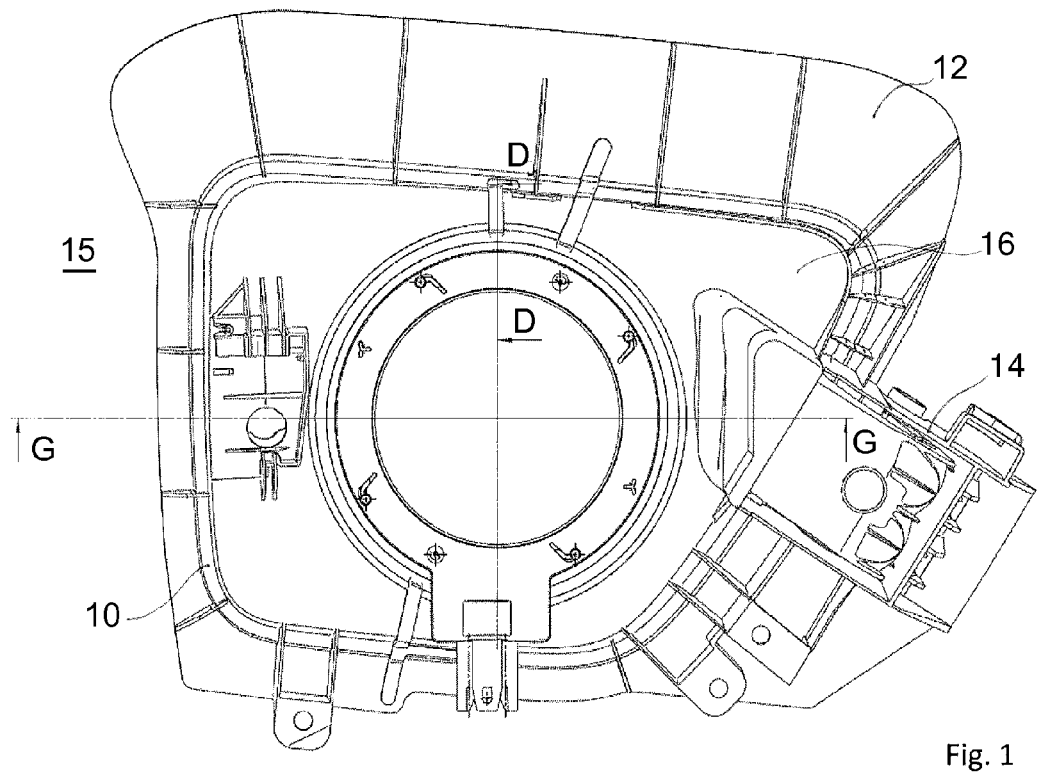
FIG. 1 shows a top view of a first exemplary embodiment of a charging housing or filler neck housing.

The charging housing or filler neck housing according to the embodiment that is shown in FIG. 1 is composed of a plastic and has a housing body 10, on the outer edge of which a tab section 12 is formed, with which the housing body 10 is fastened, for example is adhesively bonded, in the region of a body opening in a motor vehicle 15. A hinge arm 14, which is mounted pivotably on the housing body 10, is part of a closure flap and has a central section 16 on which the actual flap of the closure flap is arranged. The charging housing or filler neck housing can either be closed or opened up by the closure flap. FIG. 1 shows the closed state of the closure flap and of the hinge arm 14. The housing body 10 has a passage opening 18, which is bounded by an edge 20 of the housing body 10. In the example illustrated, a plug-in charging connector 22 with an illuminated ring (corona ring) encircling the latter on the outer side thereof is arranged in the passage opening 18. The subject matter here is therefore a charging housing. The plug-in charging connector 22 is connected to electric batteries of the motor vehicle.

Figure 2:
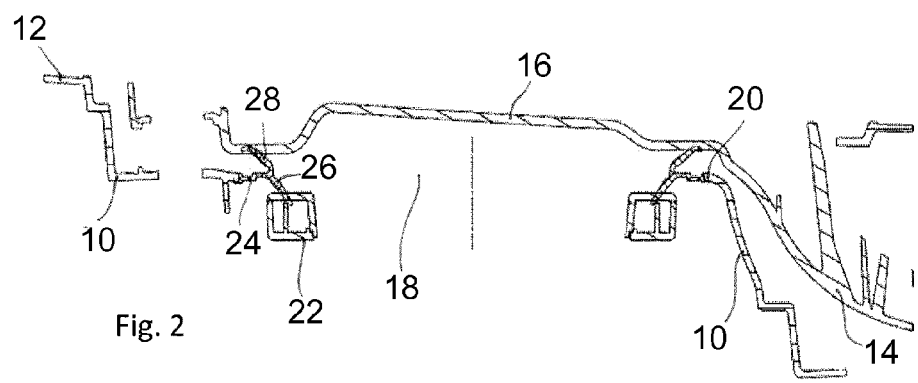
FIG. 2 shows a sectional view along the line G-G in FIG. 1.
Figure 3:
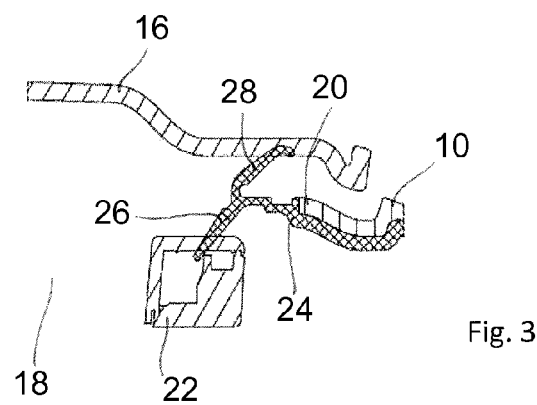
FIG. 3 shows a sectional view along the line D-D in FIG. 1.
Figure 4:
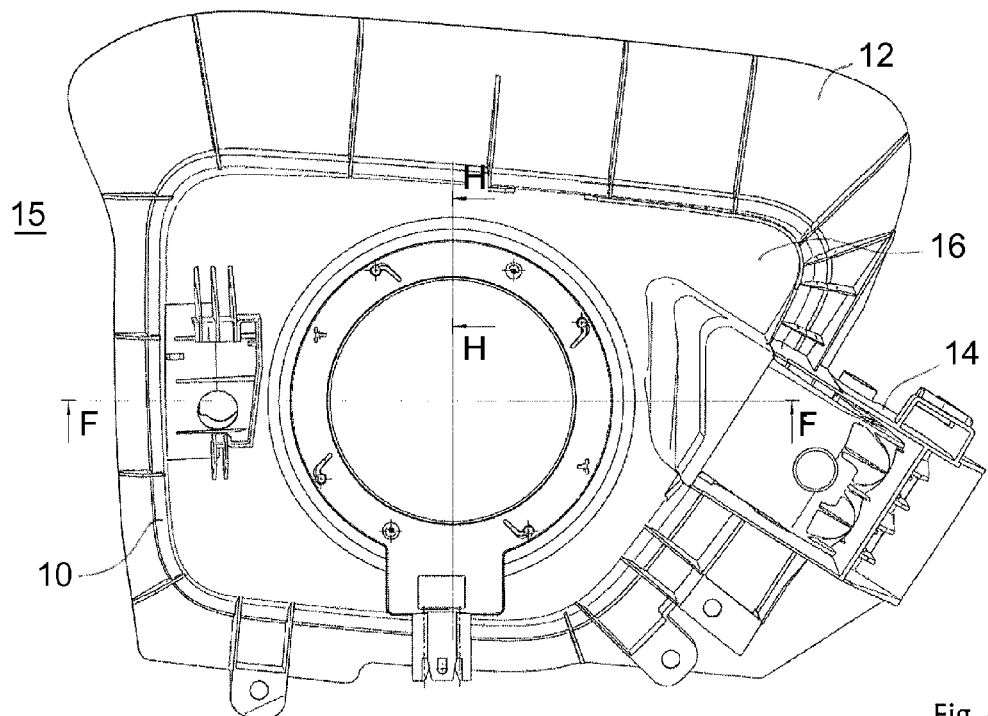
FIG. 4 shows a top view of a second exemplary embodiment of a charging housing or filler neck housing.
Figure 5:
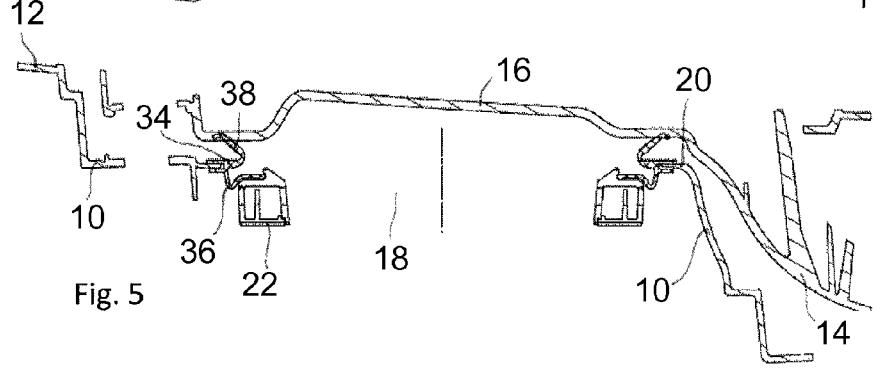
FIG. 5 shows a sectional view along the line F-F in FIG. 4.
Figure 6:
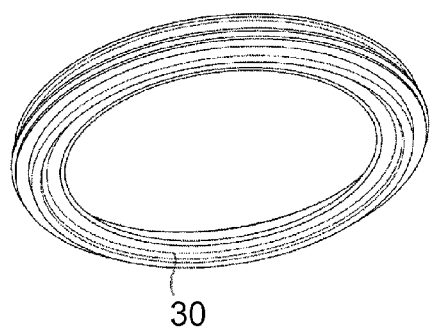
FIG. 6 shows a perspective view of a sealing ring of the charging housing or filler neck housing shown in FIG. 4.
Figure 7:
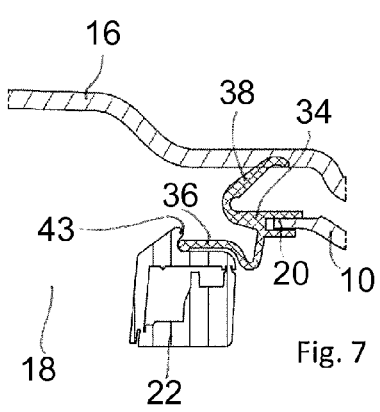
FIG. 7 shows a sectional view along the line H-H in FIG. 4.
Figure 8:
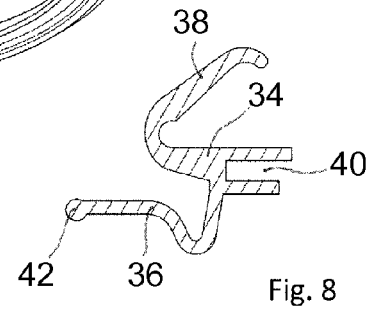
FIG. 8 shows a cross section through the sealing ring shown in FIG. 6.
Figure 9:
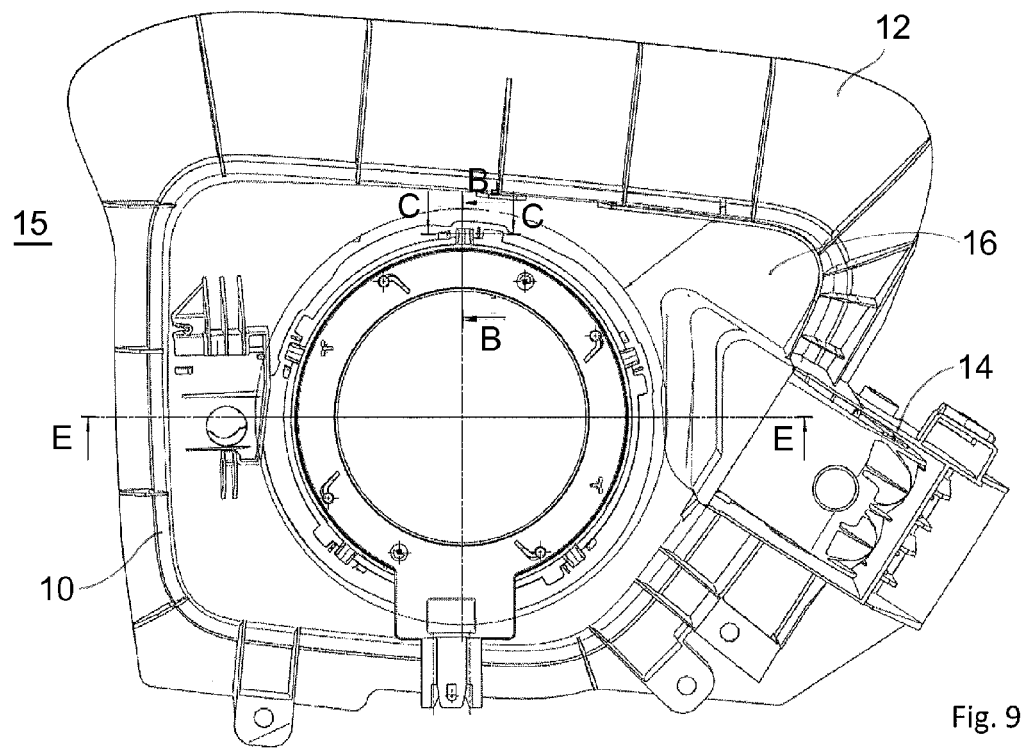
FIG. 9 shows a top view of a third exemplary embodiment of a charging housing or filler neck housing.
Figure 10:
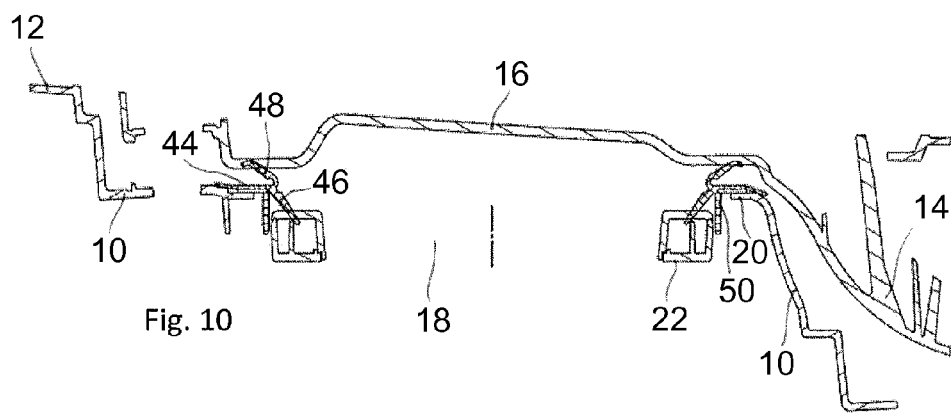
FIG. 10 shows a sectional view along the line E-E in FIG. 9.

FIGS. 2 and 3 illustrate a sealing ring according to the teachings herein, which has an annular sealing body 24, a first elastic sealing lip 26 extending from the annular sealing body 24 and a second elastic sealing lip 28 likewise extending from the annular sealing body 24. The annular sealing body 24 is likewise flexible and forms a membrane. The sealing ring, consisting of the annular sealing body 24 and the first and second sealing lips 26, 28, is formed integrally from a softer plastic than the housing body 10. It can be seen that the first and second sealing lips 26, 28 extend substantially in opposite directions from the annular sealing body 24. In the exemplary embodiment shown in FIGS. 1 to 3, the sealing ring with the annular sealing body 24 thereof is injection moulded in a two-component injection-moulding process onto the housing body 10 in the region of the edge 20 bounding the passage opening 18. The first sealing lip 26 bears against the plug-in charging connector 22 and the second sealing lip 28 bears against the inner side of the hinge arm 14 of the closure flap. Thus, by means of the sealing ring, an effective seal is provided in relation to the housing body 10, in relation to the plug-in charging connector 22 and in relation to the hinge arm 14, and therefore in relation to the closure flap, against penetration of dust, water or other contaminants.

For graphical reasons, the first and second sealing lips of the exemplary embodiments shown in the figures partially project into the plug-in charging connector 22 or the hinge arm 14. However, they actually bear against the surface of said components and are correspondingly deformed, which in part is not illustrated in the figures.

The exemplary embodiment of a charging housing or filler neck housing shown in FIGS. 4 to 8 substantially corresponds to the exemplary embodiment shown in FIGS. 1 to 3. However, it differs in respect of the sealing ring, which is illustrated in a perspective view at the reference sign 30 in FIG. 6. In this embodiment, the sealing ring 30 has an elastic annular sealing body 34, a first elastic sealing lip 36 extending from the annular sealing body 34 and a second elastic sealing lip 38 likewise extending from the annular sealing body 34. The sealing ring 30 is again composed of a softer plastic than the housing body 10. Unlike in the exemplary embodiment of FIGS. 1 to 3, the outer side of the annular sealing body 34 has an encircling slot 40 in which the outer edge 20 of the housing body 10 is accommodated in a floating manner. By means of this floating mounting, the sealing ring 30 can move laterally, in particular in a plane (X-Z plane) formed by the plane of projection in FIG. 4. In addition, it can be seen in FIG. 8 that the first sealing lip 36 of the sealing ring 30 has a thickened end section 42 that bears against a stop 43 of the plug-in charging connector 22.

In this manner, the sealing ring 30 is carried along during a movement of the plug-in charging connector 22, and the sealing ring 30 is automatically centred with respect to the plug-in charging connector 22. The illuminated corona ring is therefore always visible in a uniform width when the closure flap is open.

FIGS. 9 to 16 show a further exemplary embodiment of a charging housing or filler neck housing, which exemplary embodiment in turn substantially corresponds to the exemplary embodiment shown in FIGS. 1 to 3. The sealing ring provided in this exemplary embodiment again has an elastic annular sealing body 44 from which a first elastic sealing lip 46 and a second elastic sealing lip 48 extend. The sealing ring of the exemplary embodiment shown in FIGS. 9 to 16 is also manufactured integrally from a softer plastic than the housing body 10.

In addition, in the exemplary embodiment shown in FIGS. 9 to 16, a carrier ring 50 is provided that is mounted in a floating manner on the edge 20 bounding the passage opening 18 in the housing body 10, and the annular sealing body 44 of the sealing ring is injection moulded here in a two-component injection-moulding process onto said carrier ring 50. In the example illustrated, the carrier ring 50 is composed of a plastic, in particular a harder plastic than the sealing ring. It can be composed of the same plastic as the housing body 10 or of a different plastic. It can readily be seen in FIGS. 11, 12 and 16 that the carrier ring 50 has a slot 52 that encircles the outer side thereof and in which the edge 20 bounding the passage opening 18 in the housing body 10 is again mounted in a floating manner. This is similar to that explained with regard to the exemplary embodiment of FIGS. 3 to 8 and the slot 40 provided there in the annular sealing body 34. The annular sealing body 44, and therefore the entire sealing ring of the exemplary embodiment of FIGS. 9 to 16, is thereby also mounted in a floating manner on the edge 20 of the housing body 10. Automatic centering, as is already explained with regard to the exemplary embodiment of FIGS. 4 to 8, therefore again occurs. In the exemplary embodiment of FIGS. 9 to 16, the carrier ring 50 bears with a downwardly extended end 54 against the outer side of the plug-in charging connector 22, which outer side serves as a stop. As a result, the carrier ring 50 and, with the latter, the sealing ring, is carried along by a lateral movement of the plug-in charging connector 22. Thereby, the self-centering is realized.

Figure 11:
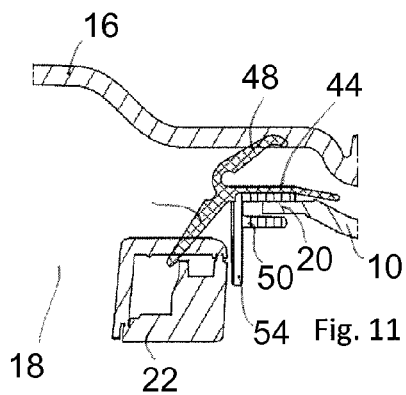
FIG. 11 shows a sectional view along the line B-B in FIG. 9 in a closed state.
Figure 12:
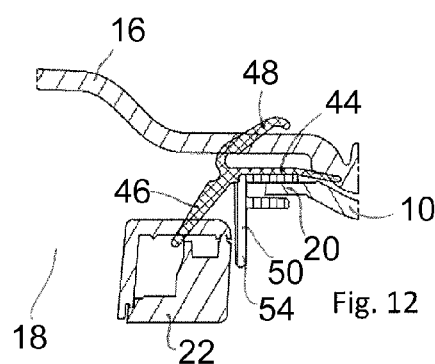
FIG. 12 shows a sectional view along the line B-B in FIG. 9 in an unlocking state.

FIG. 11 shows the closed position of the closure flap and of the hinge arm 14 thereof. In the example illustrated, the charging housing or filler neck housing is provided with a push-push unlocking device, and therefore the closure flap or the hinge arm 14 thereof has to be pressed inwards for a defined distance in the direction of the plug-in charging connector 22 for unlocking purposes. This unlocking state is shown in FIG. 12. Owing to the flexibility of the sealing lips 46, 48, the unlocking forces required in this case are relatively small.

In FIG. 14, recesses 56 can be seen uniformly over the inner circumference of the edge 20 bounding the passage opening 18. The carrier ring 50 shown in FIG. 15 has corresponding projections 58 on the lower side thereof. The projections 58 can be inserted into the recesses 56, and the carrier ring 50 can be fastened to the edge 20 by rotation in the manner of a bayonet closure.

What is claimed is:

1. A charging housing or filler neck housing for insertion into a body opening in a motor vehicle, comprising:
    a housing body with a passage opening into which a plug-in charging connector or a tank filler pipe can be inserted;
    a sealing ring arranged on the passage opening, wherein the sealing ring has an annular sealing body from which a first elastic sealing lip and a second elastic sealing lip extend, wherein the first sealing lip is designed to bear against the plug-in charging connector or tank filler pipe inserted into the passage opening, and wherein the second sealing lip is designed to bear against a closure flap closing the filler neck housing or charging housing.

2. The charging housing or filler neck housing according to claim 1, wherein the first and second elastic sealing lips extend in opposite directions from the annular sealing body.

3. The charging housing or filler neck housing according to claim 1, wherein the annular sealing body is injection moulded in a two-component injection-moulding process onto an edge bounding the passage opening in the housing body.

4. The charging housing or filler neck housing according to claim 1, wherein the sealing ring is mounted in a floating manner on the passage opening in the housing body.

5. The charging housing or filler neck housing according to claim 1, wherein at least one of:
    the first elastic sealing lip bears against a stop of the plug-in charging connector or tank filler pipe when the plug-in charging connector or tank filler pipe is inserted into the passage opening; or
    the second elastic sealing lip bears against a stop of the closure flap when the closure flap is closed.

6. The charging housing or filler neck housing according to claim 4, wherein one of:
    the annular sealing body has a slot that encircles said annular sealing body on an outer side thereof and in which an edge bounding the passage opening in the housing body is accommodated in a floating manner; or
    the edge bounding the passage opening in the housing body has an encircling slot in which the annular sealing body is accommodated in a floating manner.

7. The charging housing or filler neck housing according to claim 4, further comprising:
    a carrier ring mounted in a floating manner on an edge bounding the passage opening in the housing body, wherein the sealing body is arranged on the carrier ring.

8. The charging housing or filler neck housing according to claim 7, wherein the annular sealing body is injection moulded in a two-component injection-moulding process onto the carrier ring.

9. The charging housing or filler neck housing according to claim 7, wherein one of:
    the carrier ring has a slot that encircles an outer side thereof and in which the edge bounding the passage opening in the housing body is accommodated in a floating manner; or
    the edge bounding the passage opening in the housing body has an encircling slot in which the carrier ring is accommodated in a floating manner.

10. The charging housing or filler neck housing according to claim 7, wherein the carrier ring is connected via a bayonet connection to the edge bounding the passage opening in the housing body.

11. The charging housing or filler neck housing according to claim 1, further comprising:
    the closure flap connected to the housing body so as to be pivotable between an open position opening up the charging housing or filler neck housing and a closed position closing the charging housing or filler neck housing.

12. The charging housing or filler neck housing according to claim 11, wherein the closure flap comprises a hinge arm via which said closure flap is connected pivotably to the housing body.

13. The charging housing or filler neck housing according to claim 11, wherein the closure flap has an encircling splash wall facing the housing body.

14. The charging housing or filler neck housing according to claim 1, further comprising:
the plug-in charging connector inserted into the passage opening of the housing body or the tank filler pipe inserted into the passage opening in the housing body.

15. A motor vehicle comprising the charging housing or filler neck housing according to claim 1 inserted into the body opening in the motor vehicle.

16. A charging housing or filler neck housing for insertion into a body opening in a motor vehicle, comprising:
a housing body with a passage opening; and
an elastic sealing ring comprising:
an annular sealing body arranged about an edge bounding the passage opening of the housing body;
a first sealing lip extending from the annular sealing body and having an outer end designed to contact a plug-in charging connector or a tank filler pipe inserted into the passage opening; and
a second elastic sealing lip extending from the annular sealing body and having an outer end designed to contact a closure flap covering the passage opening.

17. The charging housing or filler neck housing of claim 16, further comprising:
the closure flap comprising a hinge arm and a central flap section, the outer end of the second sealing lip in contact with the central flap section of the closure flap.

18. The charging housing or filler neck housing of claim 16, wherein the annular sealing body comprises a slot extending away from the passage opening and surrounding the edge bounding the passage opening.

19. The charging housing or filler neck housing of claim 16, further comprising:
an annular carrier ring arranged on the edge bounding the passage opening, the annular sealing body in contact with the annular carrier ring.

20. The charging housing or filler neck housing of claim 19, wherein the annular carrier ring comprises a slot extending away from the passage opening and surrounding the edge bounding the passage opening.

* * * * *